(12) United States Patent
Bell et al.

(10) Patent No.: US 8,060,157 B2
(45) Date of Patent: Nov. 15, 2011

(54) RECESSED HINGE

(75) Inventors: Gary Bell, San Diego, CA (US); Jukka Kallio, Kiiminki (FI); Justin Lyles, San Diego, CA (US); Jonathan Dry, Newbury Park, CA (US)

(73) Assignee: Nokia Corporation, Espoo (FI)

( * ) Notice: Subject to any disclaimer, the term of this patent is extended or adjusted under 35 U.S.C. 154(b) by 868 days.

(21) Appl. No.: 11/998,090

(22) Filed: Nov. 27, 2007

(65) Prior Publication Data

US 2009/0137292 A1 May 28, 2009

(51) Int. Cl.
*H04Q 7/32* (2006.01)

(52) U.S. Cl. ............... 455/575.1; 455/575.3; 455/550.1; 455/90.3; 455/422.1; 455/73; 379/433.01; 379/433.11; 379/433.08; D14/137; D14/345

(58) Field of Classification Search .... 455/575.1–575.8, 455/90.1–90.3, 550.1, 422.1, 73; 379/433.01, 379/433.11, 433.08; D14/137, 138, 345
See application file for complete search history.

(56) References Cited

U.S. PATENT DOCUMENTS

| | | | |
|---|---|---|---|
| D449,605 S * | 10/2001 | Schebesch et al. | D14/345 |
| 7,457,648 B2 * | 11/2008 | Katou et al. | 455/575.1 |
| 2001/0003707 A1 * | 6/2001 | Moriya | 455/566 |
| 2002/0173281 A1 * | 11/2002 | Kobayashi | 455/90 |
| 2004/0127269 A1 * | 7/2004 | Nonaka | 455/575.3 |
| 2005/0107143 A1 * | 5/2005 | Oyama | 455/575.3 |
| 2007/0178949 A1 * | 8/2007 | Sato et al. | 455/575.3 |

* cited by examiner

*Primary Examiner* — Keith T Ferguson
(74) *Attorney, Agent, or Firm* — Harrington & Smith

(57) ABSTRACT

An apparatus including a first housing section having a first one-piece housing member; a second housing section having a second one-piece housing member; and a hinge rotatably connecting the first and second housing sections to each other. The hinge includes the first housing member forming a first hinge section at a first end of the first housing section which is pivotably connected to a second hinge section formed by the second housing member at a second end of the second housing member. The first and second hinge sections form opposite outer lateral ends of the hinge. The first and second hinge sections are spaced from outer lateral sides of the first and second housing sections. An axis of rotation of the hinge extends generally between the outer lateral sides.

17 Claims, 7 Drawing Sheets

RECESSED HINGE

BACKGROUND OF THE INVENTION

1. Field of the Invention

The invention relates to a hinge and, more particularly, to a hinge which is at least partially recessed.

2. Brief Description of Prior Developments

FIG. 1 shows an example of a folding telephone handset 10. This type of handset is also known as a clam-shell type of handset. A hinge 12 pivotably connects a first housing section 14 to a second housing section 16.

It is very common for a person to accidentally drop a hand-held portable electronic device. Since, the device is portable (such as a wireless mobile handset for example) it is typically carried in the hand and held to the ear where it can fall to the floor. An exposed hinge, such as hinge 12, can make the handset difficult to hold, and the drop distance to the floor can cause damage to the device in the form of cracks to the housing member(s). The hinge in a folding type of handset seems to be especially vulnerable, since the hinge housing typically forms the corners of one end 18 of the handset, and is under more stress when it allows the handset to open and close (such as being spring biased in a position). An example of damage is shown in FIG. 2. The first housing section 14 has suffered cracks 20, 22 when the handset was dropped.

There is a need for a new type of hinge for a portable hand-held device which is less prone to damage if the device is accidentally dropped. There is also a desire to provide a portable hand-held device in which the hinge does not make the device difficult to hold.

SUMMARY OF THE INVENTION

In accordance with one aspect of the invention, an apparatus is provided including a first housing section having a first one-piece housing member; a second housing section having a second one-piece housing member; and a hinge rotatably connecting the first and second housing sections to each other. The hinge includes the first housing member forming a first hinge section at a first end of the first housing section which is pivotably connected to a second hinge section formed by the second housing member at a second end of the second housing member. The first and second hinge sections form opposite outer lateral ends of the hinge. The first and second hinge sections are spaced from outer lateral sides of the first and second housing sections. An axis of rotation of the hinge extends generally between the outer lateral sides.

In accordance with another aspect of the invention, an apparatus is provided comprising a first housing section having a first one-piece molded plastic housing member; a second housing section having a second one-piece molded plastic housing member; a hinge and caps. The hinge rotatably connects the first and second housing sections to each other. The hinge comprises the first housing member forming a first hinge section at a first end of the first housing section which is pivotably connected to a second hinge section of the second housing member at a second end of the second housing member. The first and second hinge sections form opposite outer lateral ends of the hinge. The caps are connected to the second housing member. The caps comprise portions which are located opposite the opposite outer lateral ends of the hinge.

In accordance with another aspect of the invention, a portable handheld electronic device is provided comprising two housings moveable relative to one another between an open and a closed position and coupled by a hinge, the open position defining a main operating facia and a substantially planar rear surface wherein the hinge is recessed relative to the rear surface when in the open position and the hinge is recessed relative to lateral side edges of the main operating facia.

In accordance with another aspect of the invention, a method is provided comprising providing a first housing member and a second housing member comprised of molded plastic material; rotatably connecting the housing members to each other at a hinge, wherein the hinge comprises the first housing member forming a first hinge section at a first end of the first housing section which is pivotably connected to a second hinge section formed by the second housing member at a second end of the second housing member, wherein the first and second hinge sections form opposite outer lateral ends of the hinge; and connecting caps to the second housing member, wherein the caps comprise portions which are located opposite the opposite outer lateral ends of the hinge.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 1:
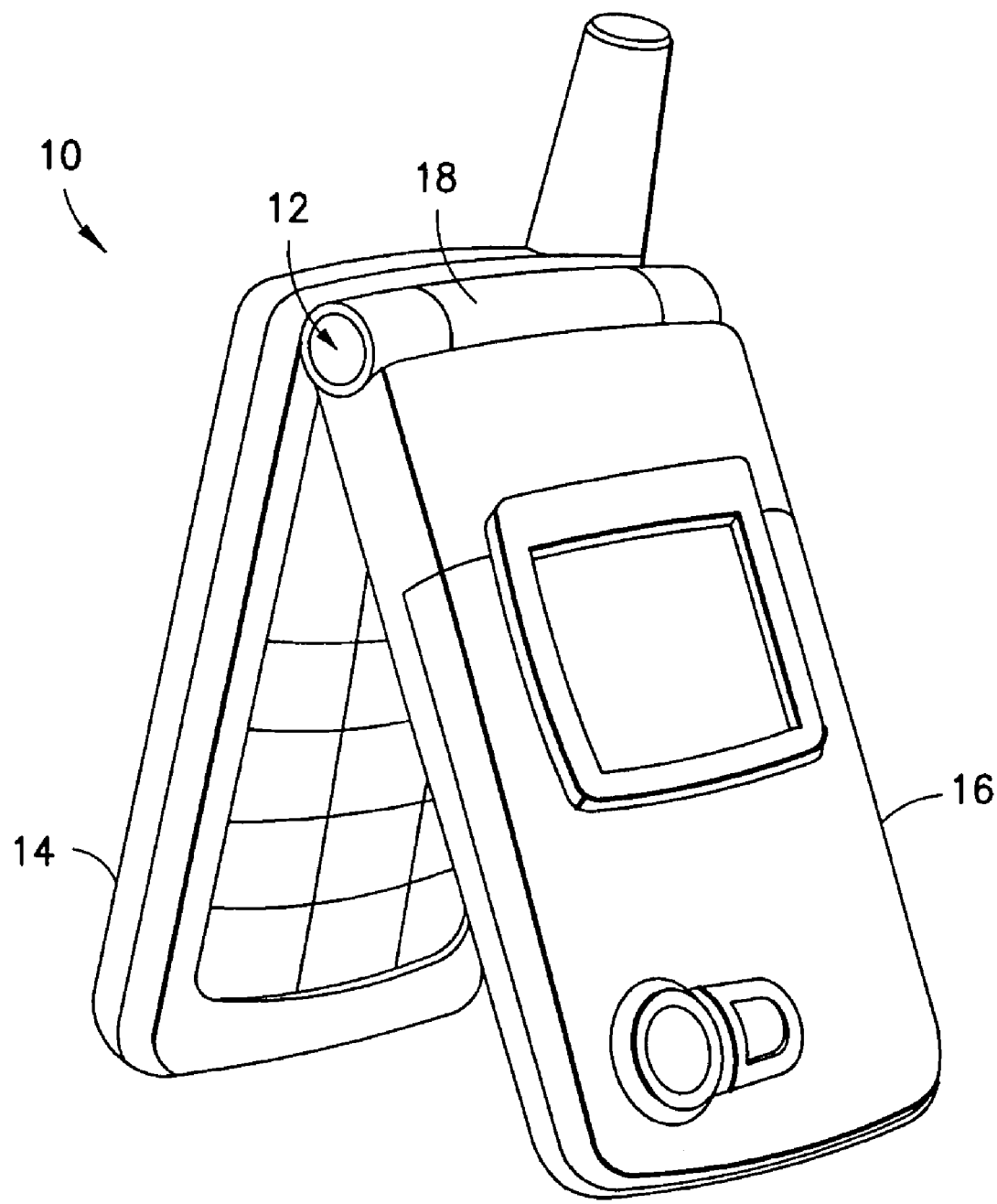
FIG. 1 is a perspective view of a conventional mobile telephone.

The present invention relates generally to electronics devices having hinges, and more particularly to portable wireless handsets having hinged housing portions held in the hand, for example mobile wireless communications handsets, hinge mechanisms and methods therefore.

Referring to FIGS. 3-7, there is shown an apparatus 24 incorporating features of the invention. Although the invention will be described with reference to the exemplary embodiment shown in the drawings, it should be understood that the invention can be embodied in many alternate forms of embodiments. In addition, any suitable size, shape or type of elements or materials could be used.

The apparatus 24 is a mobile telephone. However, features of the invention could be used in any suitable type of handheld portable electronic device. In addition, it is well known for a hand-held portable electronic device to have multiple different applications, such as a music player application, a gaming device application, a digital camera application, a digital video recorder application, a telephone application, and/or an Internet browser application. It should be understood that features of the invention could be used in an apparatus have one or more of these applications.

The mobile telephone 24 is a flip-phone or folding type of handset. This type of telephone allows a user to hold the handset with a single hand at his/her ear and mouth, and also allows single handed opening and closing, as well as single hand pressing of keys while also holding the handset with the same hand. The telephone 24 generally comprises a first housing section 26 and a second housing section 28 which are movably connected to each other at a hinge 30. However, in alternate embodiments, more movable housing sections could be provided. In the embodiment shown, the first housing section 26 has a front face 32 which comprises an alphanumeric key pad 34 and control keys 36. However, in alternate embodiments any suitable type of user input(s) could be provided at the front face 32. The first housing section 26 comprises a rechargeable battery 38 and electronic circuitry 40 inside a housing. The electronic circuitry can include, for example, a printed circuit board having a memory and a controller, such as a microprocessor.

The second housing section 28 generally comprises a front face 42 on a first side and a rear face 44 on an opposite second side. The front face 42 comprises a first display 46 and the rear face 44 has a second display 48. However, in an alternate embodiment the telephone might only have one display, such as the second display 48 for example. The second housing section 28 could comprise other features. In the telephone handset embodiment shown, the second housing section 28 includes a speaker or sound transducer for example.

Figure 3:
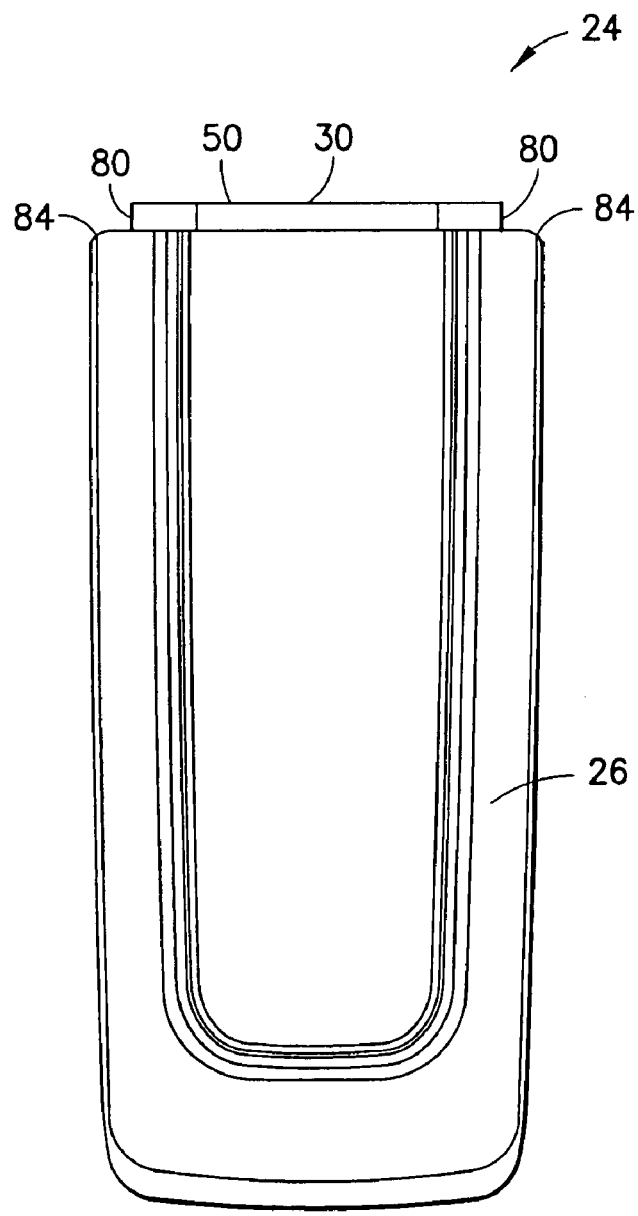
FIG. 3 is a rear side elevational view of an apparatus comprising features of the invention in a closed configuration.
Figure 4:
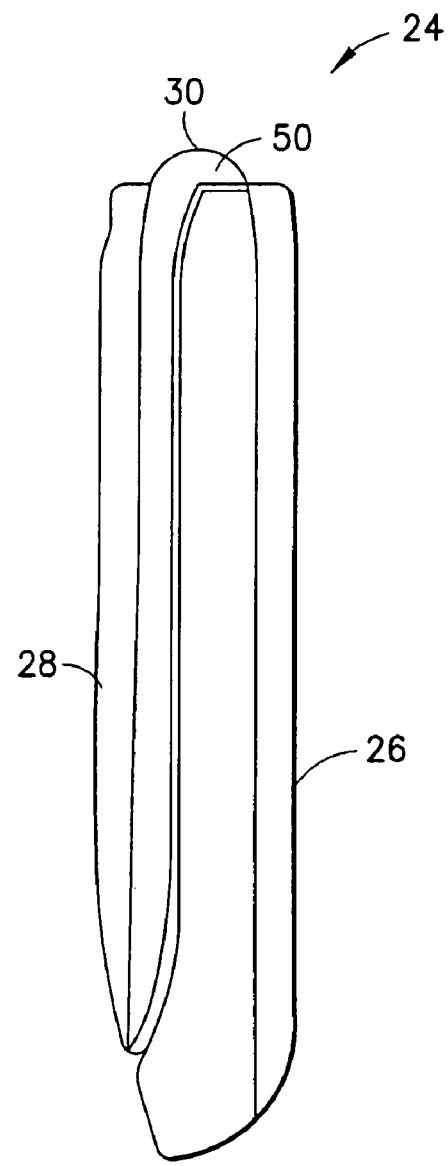
FIG. 4 is a lateral side view of the apparatus shown in FIG. 3.
Figure 5:
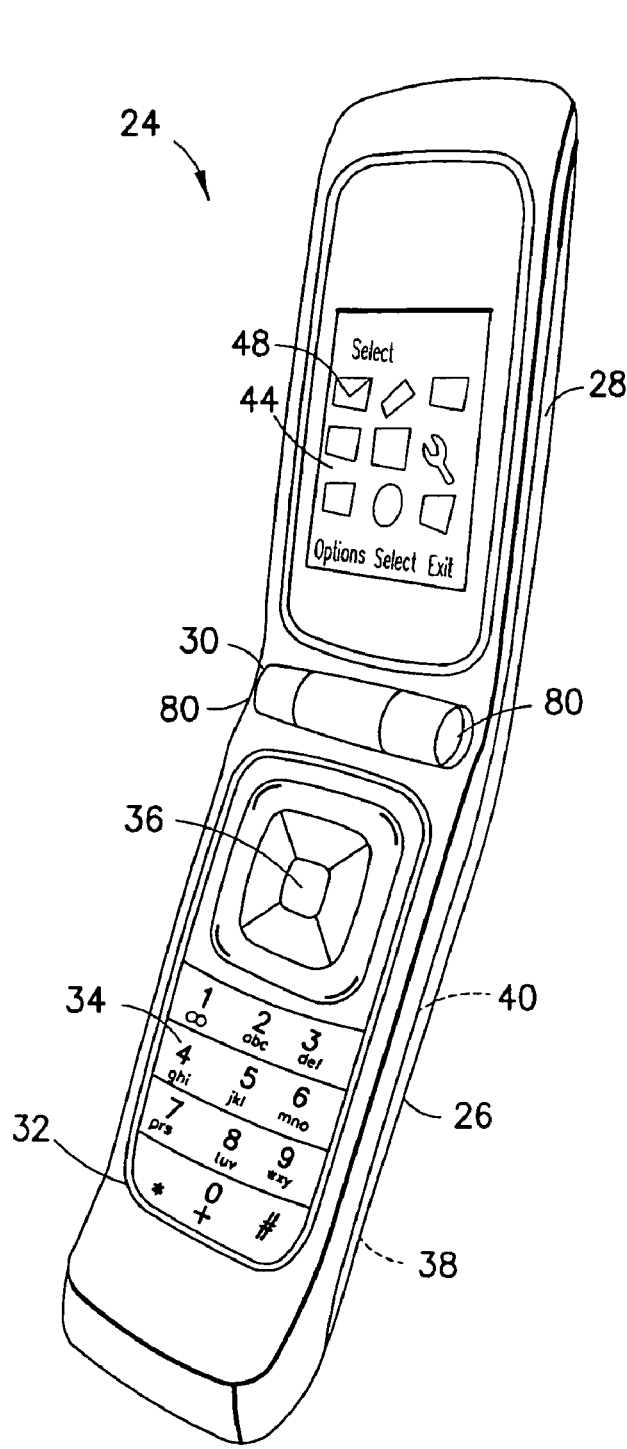
FIG. 5 is a perspective view of the apparatus shown in FIGS. 3-4 in an open configuration.
Figure 6:
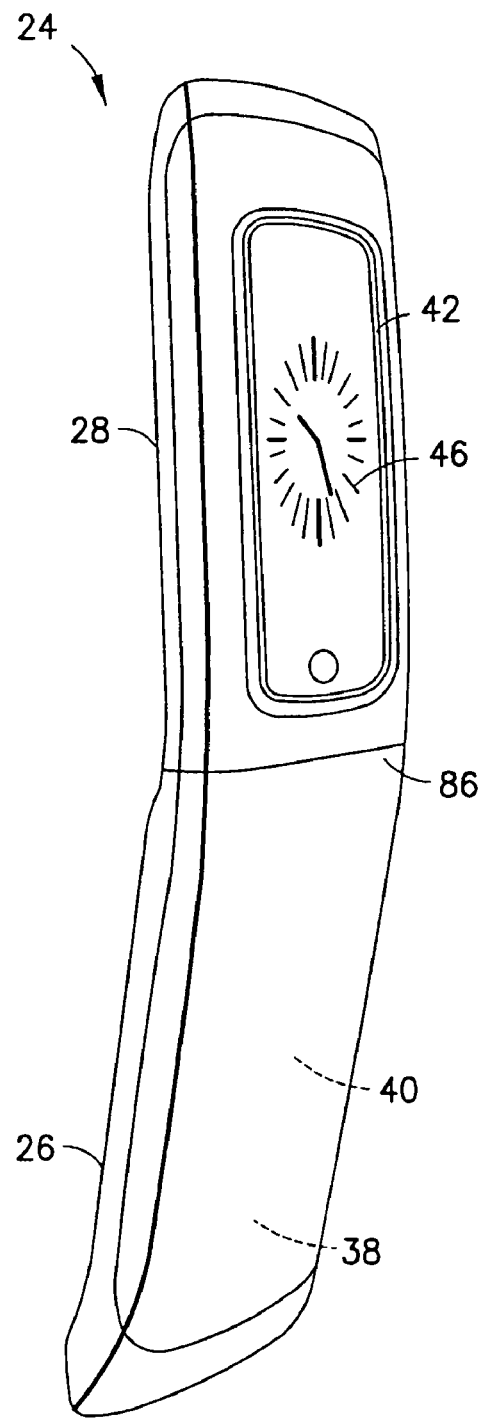
FIG. 6 is a perspective view as in FIG. 5 showing a rear side of the apparatus.
Figure 7:
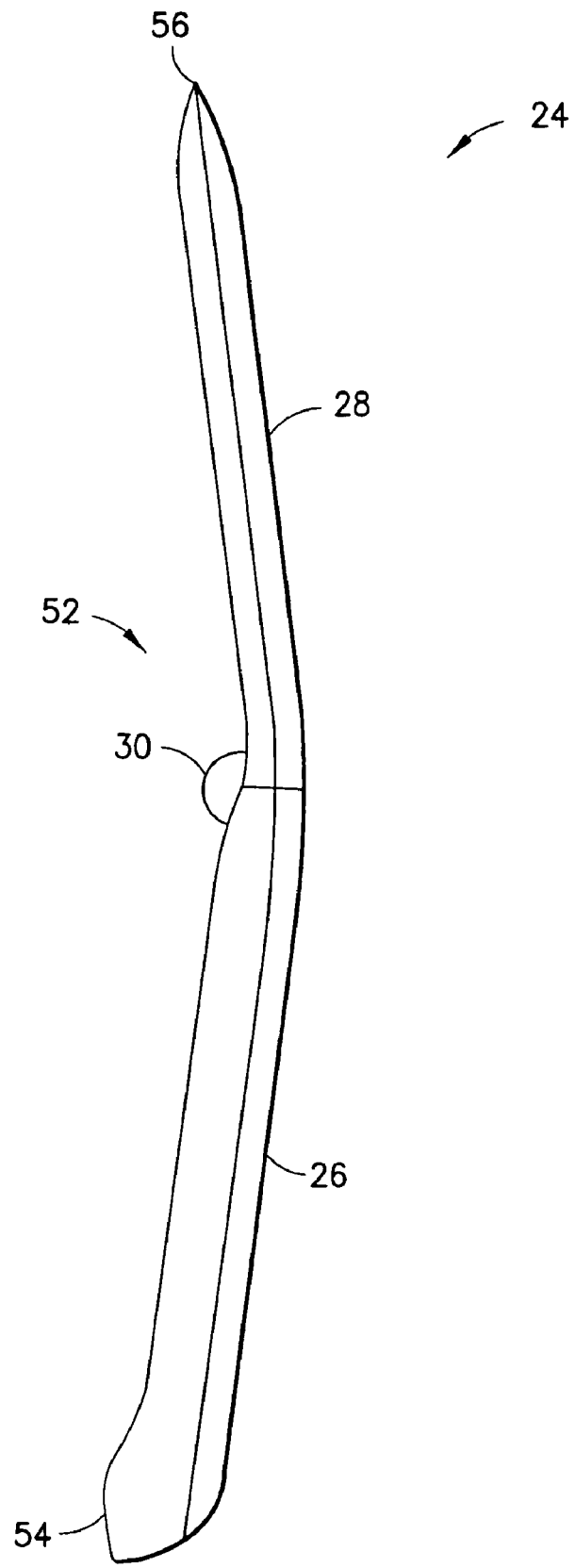
FIG. 7 is a lateral side view of the apparatus shown in FIGS. 5-6.

As noted above, the first and second housing sections 26, 28 are movably connected to each other by the hinge 30. FIGS. 3-4 show the telephone 24 in a first closed or folded configuration. FIGS. 5-7 show the telephone 24 is a second open or unfolded configuration. In the closed configuration the second housing section 28 is folded over the front face 32 of the first housing section 26. This configuration protects the second display 48 and user inputs 34, 36. However, the first display 46 is viewable by a user. The hinge 30 is located at an end 50 of the telephone 24 in this closed configuration.

In the open configuration, the second housing section 28 extends from the first housing section 26 in a general cantilever fashion by connection at the hinge 30. The two sections 26, 28 are angled relative to each other, such as at an angle of about 165 degrees for example. However, any suitable angle could be provided. As seen best in FIG. 5, the user inputs 34, 36 on the front face 32 and the second display 48 on the second housing section 28 are exposed and face the same direction. Also as seen in FIG. 5, a portion of the hinge 30 is exposed in the open configuration, but only on the same side of the telephone as the user inputs 34, 36 on the front face 32 and the second display 48. As seen in FIG. 7, the angled shape of the housing sections 26, 28 form a recessed area 52 for the hinge 30 between the opposite ends 54, 56. This helps to protect the hinge 30 from contact with a surface if the telephone 24 is accidentally dropped while in the open configuration.

Figure 8:
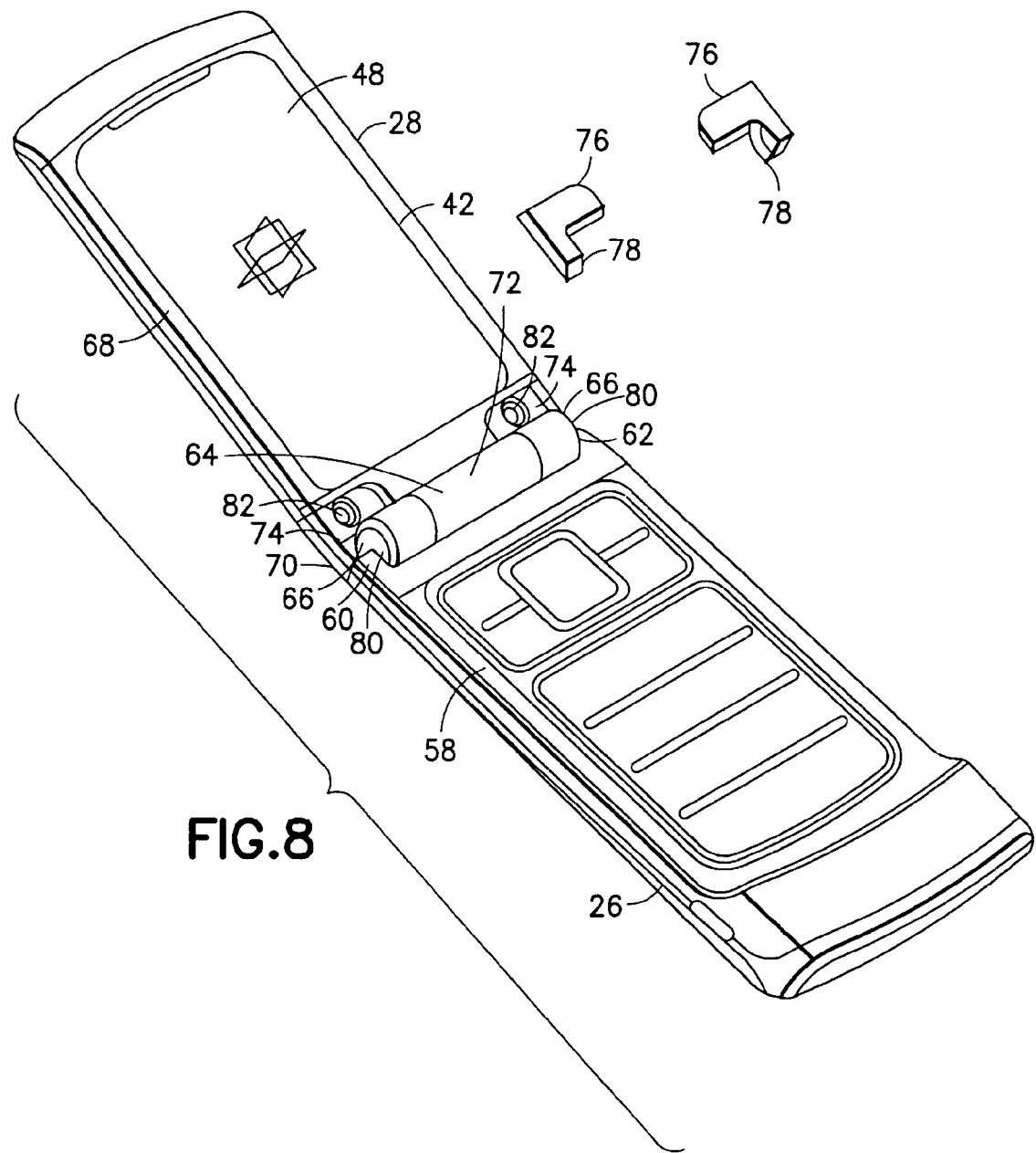
FIG. 8 is a perspective view of the apparatus shown in FIG. 5 during assembly.

Referring also to FIG. 8, the first housing section 26 includes a first housing member 58 which forms a part of the housing for the first housing section 26. The first housing member 58 is preferably comprised of molded plastic or polymer material. The first housing member 58 extends along a majority of the length of the front face 32. The top end 60 of the first housing member 58 forms a first hinge section 62 of the hinge 30. The first hinge section 62 is rotatably connected to a second hinge section 64 of the second housing section 28 to thereby form the hinge 30 and allow the first and second housing sections 26, 28 to be rotatable relative to each other. The first housing member 58 is preferably a one-piece member. Thus, the first hinge section 62 is integrally formed with the rest of the first housing member 58 when the first housing member 58 is formed. In this embodiment the first hinge section 62 comprises two opposite end sections 66 of the hinge 30.

The second housing section 28 includes a second housing member 68 which forms a part of the housing for the second housing section 28. The second housing member 68 is preferably comprised of molded plastic or polymer material. The second housing member 68 extends along a majority of the length of the face 42. The bottom end 70 of the second housing member 68 forms the second hinge section 64 of the hinge 30. The second hinge section 64 is rotatably connected to the first hinge section 62 of the first housing section 28 to thereby form the hinge 30 and allow the first and second housing sections 26, 28 to be rotatable relative to each other. The second housing member 68 is preferably a one-piece member. Thus, the second hinge section 64 is integrally formed with the rest of the second housing member 68 when the second housing member 68 is formed. In this embodiment the second hinge section 64 comprises a single tube shaped section 72 of the hinge 30. However, in alternate embodiments the first and second hinge sections 62, 64 could comprise any suitable number and arrangement of hinge tube and end sections.

As seen best in FIG. 8, the tube section 72 is received between the two end sections 66. The second housing member 68 has recesses 74 to provide a clearance to allow the two housing members 58, 68 to be connected to each other at the hinge sections 62, 64. The recesses 74 provide clearance for the end sections 66 during assembly. After assembly of the hinge sections 62, 64 to each other, caps 76 are connected to the second housing member 68. The caps 76 have portions 78 which are located opposite the opposite outer lateral ends 80 of the hinge 30 formed by the outer ends of the end sections 66. Thus, as seen best in FIG. 5, the opposite outer lateral ends 80 of the hinge 30 are recessed inward from the lateral sides of the telephone 24, and the caps 76 and portions of the housings of the first and second housing sections 24, 26 help to protect the opposite outer lateral ends 80 of the hinge 30 from direct contact with another member at the lateral sides of the telephone. The caps 76 can also function as covers to cover the screws 82 connecting the second housing member 68 to another housing member of the second housing section 28.

As seen in FIG. 3, in the closed configuration the outer lateral ends 80 of the hinge 30 do not form the outermost lateral corners of the end 50 of the telephone 24. Instead, the outermost corners 84 are formed by other portions of the first and second housing sections 26, 28 which are less prone to damage than the hollow hinge sections 62, 64.

In the open configuration as seen in FIGS. 5-7, multiple features help to protect the hinge sections 62, 64 from direct contact with a surface if the telephone is accidentally dropped. The recess 52 as shown in FIG. 7 helps to protect the hinge 30 from direct contact with a surface if the telephone is accidentally dropped. As seen best in FIG. 5, the lateral outer ends 80 of the hinge 30 being recessed or spaced from the outer lateral sides of the telephone help to protect the hinge 30 if the telephone is accidentally dropped. As seen best in FIG. 6, the two housing sections 26, 28 completely cover the hinge 30 at the rear side 86 to protect the hinge 30 if the telephone is accidentally dropped. With the invention, as seen in FIGS. 5 and 6, the open position can define a main operating facia and a substantially planar rear surface wherein the hinge is recessed relative to the rear surface when in the open position and the hinge is recessed relative to lateral side edges of the main operating facia.

In order to overcome previous product short comings in reliability, industrial design, and usability, novel concepts have to be created to realize design and hinge reliability gains in high volume manufacturing. These problems can be solved with unique hinge assemblies and designs that solve the problem in a novel way or a new manufacturing technique can be created.

Mobile handsets are susceptible to being dropped and cracks result. It is very common to see these cracks appear in the corners of the product. In folding type phones this is even more common in the exposed hinge area since this has the added stress induced by the opening and closing of the handset. By recessing the hinge into the phone the stress is reduced during the act of being dropped and, therefore, less prone to damage. This also creates a smooth back that is easier to hold and less likely to be dropped in the first place.

Figure 2:
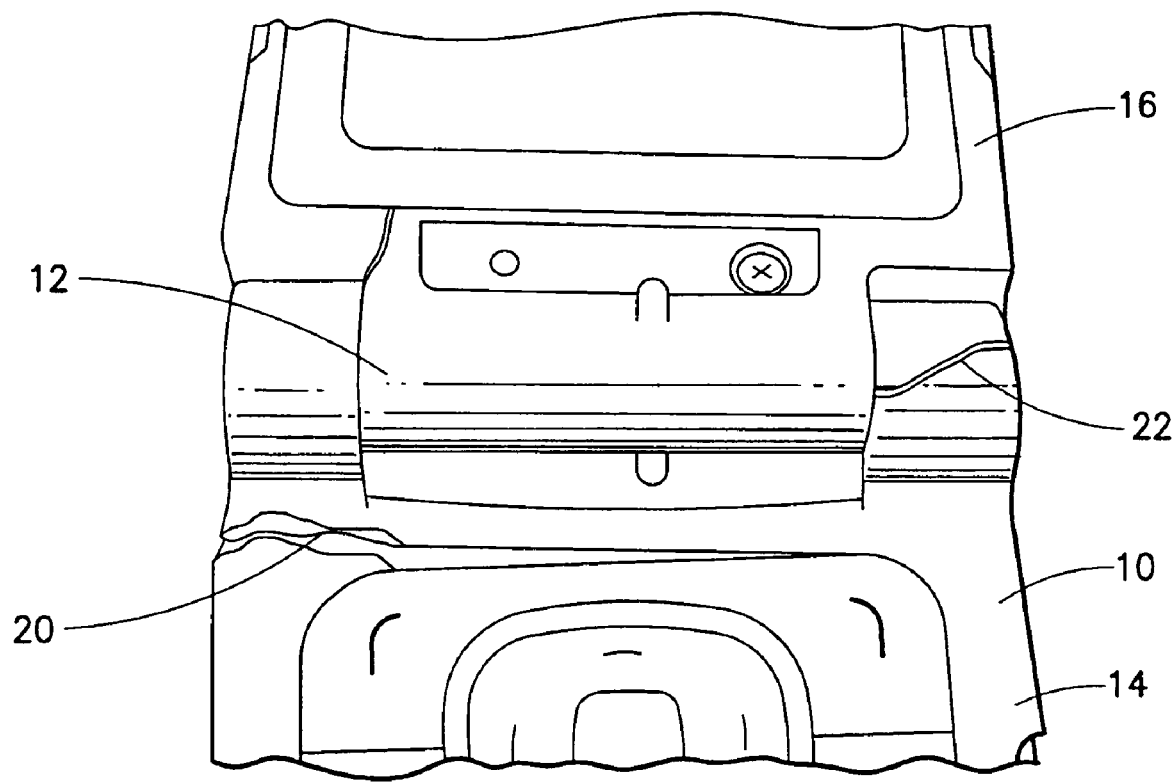
FIG. 2 is a partial view of the telephone shown in FIG. 1 showing typical potential damage from the telephone being dropped.

When the hinge is recessed into the body of the phone it is less likely to become damaged when dropped. FIG. 2 presents the typical phone damage caused from a drop. Having a hinge that is protected by recessing provides two benefits. First, a smooth and attractive side to the product can be provided in the open configuration as shown in FIG. 6 compared to other products were the hinge is still exposed to the side of the product. Second, moving the hinge away from the corners of the handset lowers the stress in the hinge from a drop. In order to realize this advantage a way had to be invented to enable the hinge to be located internally (away from the corners and the lateral sides of the device) and still be able to make the parts from injection molded plastic. The solution was to make the hinge recessed into the body of the device, providing a clearance gap in one of the molded pieces, and "caps" are subsequently connected to close off the gap. This allows the housing parts to be injection molded.

An advantage is that the problem is solved while having the additional parts serve two functions: 1) provide clearance to allow for the use of conventional injection molding practices, and 2) serve as covers for screws that are used in the top assembly of the handset. The concept also creates a smooth back that is easier to hold and less likely to be dropped out of the hand.

Figure 9:
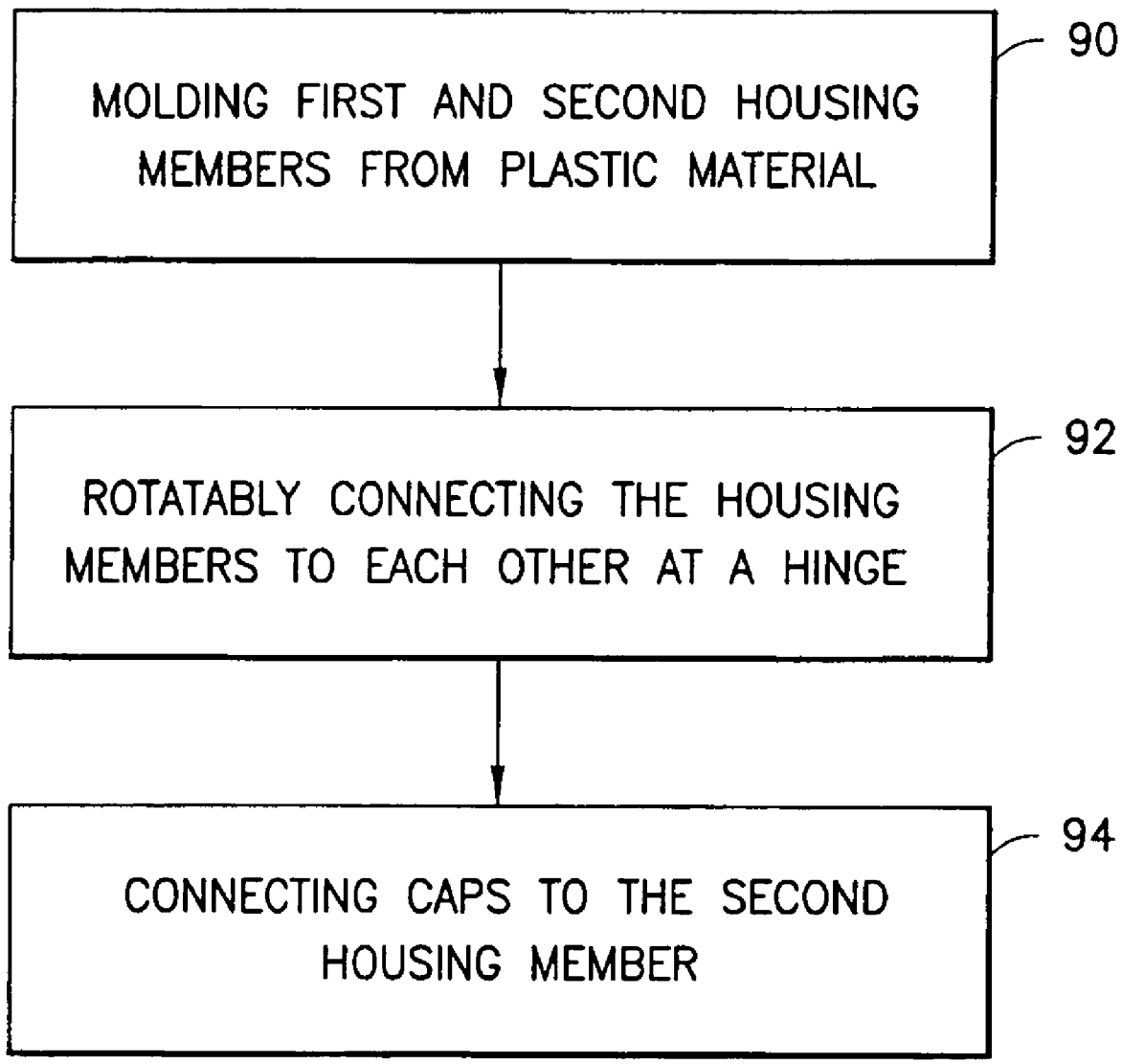
FIG. 9 is a chart showing a method of the invention.

Referring also to FIG. 9, one method of the invention can comprise molding the first and second housing members from a plastic or polymer material as indicated by block 90. The first and second housing members are each one-piece members and preferably comprise integral portions that form hinge sections. The housing members are rotatably connected to each other as indicated by block 92. The hinge sections are connected to each other to form the hinge. As indicated by block 94 caps can then be connected to one of the housing members to close a clearance gap which was necessary to assemble the hinge sections to each other. This is only one example of a method of manufacturing an apparatus comprising the invention. Other alternative methods could be used.

It should be understood that the foregoing description is only illustrative of the invention. Various alternatives and modifications can be devised by those skilled in the art without departing from the invention. For example, features recited in the various dependent claims could be combined with each other in any suitable combination(s). Accordingly, the invention is intended to embrace all such alternatives, modifications and variances which fall within the scope of the appended claims.

What is claimed is:

1. An apparatus comprising:
   a first housing section having a first one-piece housing member;
   a second housing section having a second one-piece housing member;
   a hinge rotatably connecting the first and second housing sections to each other, wherein the hinge comprises the first housing member forming a first hinge section at a first end of the first housing section which is pivotably connected to a second hinge section formed by the second housing member at a second end of the second housing member, wherein the first hinge section forms a first outer lateral end of the hinge proximate a first outer lateral side of the first housing section, wherein the first hinge section is spaced from the first outer lateral side of the first housing section and the second hinge section is spaced from the second outer lateral side of the first housing section, where portions of the first and second housing sections cover a portion of an outer lateral side of the hinge at the first outer lateral end of the hinge, and wherein an axis of rotation of the hinge extends generally between the outer lateral sides.

2. An apparatus as in claim 1 wherein the second housing section comprises a display and the first housing section comprises a keypad.

3. An apparatus as in claim 1 wherein the second hinge section comprises a single tube section and the first hinge section comprise two end sections at opposite ends of the single tube section.

4. An apparatus as in claim 1 wherein the first and second housing sections are rotatably connected to each other by the hinge between a closed position and an open position, wherein in the open position the hinge is recessed at a rear side of the apparatus by the first and second housing sections.

5. An apparatus as in claim 4 wherein in the closed position the hinge is spaced from corners of the apparatus formed by the first and second ends of the first and second housing sections.

6. An apparatus as in claim 1 further comprising caps connected to the second housing member, wherein the caps comprise portions which are located opposite the opposite outer lateral ends of the hinge.

7. An apparatus as in claim 1 further comprising means for reducing stress on the first housing member at the hinge if the apparatus is dropped.

8. An apparatus as in claim 1 wherein the apparatus is a hand-held portable electronic device comprising a display and a battery.

9. An apparatus comprising:
   a first housing section having a first one-piece molded plastic housing member;
   a second housing section having a second one-piece molded plastic housing member;
   a hinge rotatably connecting the first and second housing sections to each other, wherein the hinge comprises the first housing member forming a first hinge section at a first end of the first housing section which is pivotably connected to a second hinge section of the second housing member at a second end of the second housing member, wherein the first hinge section forms opposite outer lateral ends of the hinge; and
   caps connected to the second housing member, wherein the caps comprise portions which are located opposite the opposite outer lateral ends of the hinge laterally outward from the outer lateral ends of the hinge.

10. An apparatus as in claim 9 wherein the first and second hinge sections are spaced from outer lateral sides of the first and second housing sections, and wherein an axis of rotation of the hinge extends generally, between the outer lateral sides.

11. An apparatus as in claim 9 wherein the second housing section comprises a display and the first housing section comprises a keypad.

12. An apparatus as in claim 9 wherein the second hinge section comprises a single tube section and the first hinge section comprise two end sections at opposite ends of the single tube section.

13. An apparatus as in claim 9 wherein the first and second housing sections are rotatably connected to each other by the hinge between a closed position and an open position, wherein in the open position the hinge is recessed at a rear side of the apparatus by the first and second housing sections.

14. An apparatus as in claim 13 wherein in the closed position the hinge is spaced from corners of the apparatus formed by the first and second ends of the first and second housing sections.

15. An apparatus as in claim 9 further comprising means for reducing stress on the first housing member at the hinge if the apparatus is dropped.

16. An apparatus as in claim 9 wherein the apparatus is a hand-held portable electronic device comprising a display and a battery.

17. A method comprising:
providing a first housing member and a second housing member comprised of molded plastic material;
rotatably connecting the housing members to each other at a hinge, wherein the hinge comprises the first housing member forming a first hinge section at a first end of the first housing section which is pivotably connected to a second hinge section formed by the second housing member at a second end of the second housing member, wherein the first hinge section forms a first outer lateral end of the hinge; and
connecting caps to the second housing member, wherein a first one of the caps is connected proximate the first outer end of the hinge and comprises a portion which is located laterally outward from the first outer lateral end of the hinge and opposite the first outer lateral end of the hinge.

* * * * *